United States Patent
Shimamura et al.

(10) Patent No.: US 7,270,021 B2
(45) Date of Patent: Sep. 18, 2007

(54) APPARATUS AND METHOD FOR MOUNTING AND MOVING A WORKING APPARATUS ON A STRUCTURE FOR THE PERFORMANCE OF WORKS ON THE STRUCTURE

(75) Inventors: Mitsuaki Shimamura, Yokohama (JP); Motohiko Kimura, Yokohama (JP); Tomoyuki Ito, Yokohama (JP); Yasuhiro Yuguchi, Yokohama (JP); Toru Taguchi, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 11/270,832

(22) Filed: Nov. 10, 2005

(65) Prior Publication Data

US 2006/0222138 A1 Oct. 5, 2006

(30) Foreign Application Priority Data

Mar. 31, 2005 (JP) .............................. 2005-102859

(51) Int. Cl.
 *G21C 17/01* (2006.01)
 *G21C 17/013* (2006.01)
(52) U.S. Cl. .................... 73/865.8; 73/598; 73/618; 73/633; 976/DIG. 213
(58) Field of Classification Search .............. 73/86, 73/151, 598, 618, 633, 865.8, 866.1, 866.3, 73/866.5; 74/457, 458, 459.5, 460; 356/3.03; 405/190, 191; 702/39; 976/DIG. 213
See application file for complete search history.

(56) References Cited

U.S. PATENT DOCUMENTS

| | | | | |
|---|---|---|---|---|
| 4,722,225 A | * | 2/1988 | Hardy et al. ................. | 73/622 |
| 5,730,553 A | * | 3/1998 | Miura et al. ................. | 405/191 |
| 5,878,099 A | * | 3/1999 | Burrows et al. ............. | 376/260 |
| 6,715,201 B2 | * | 4/2004 | Sato et al. .................... | 29/712 |
| 7,134,352 B2 | * | 11/2006 | Davis et al. ................. | 73/865.8 |
| 2003/0048081 A1 | * | 3/2003 | Seemann ...................... | 318/68 |

FOREIGN PATENT DOCUMENTS

| | | | |
|---|---|---|---|
| JP | 9-15376 A | | 1/1997 |
| JP | 10-221484 A | | 8/1998 |
| JP | 10221481 A | * | 8/1998 |
| JP | 11-109082 A | | 4/1999 |
| JP | 11109081 A | * | 4/1999 |
| JP | 11-174192 A | | 7/1999 |
| JP | 11-326291 A | | 11/1999 |

* cited by examiner

Primary Examiner—Hezron Williams
Assistant Examiner—David A. Rogers
(74) Attorney, Agent, or Firm—Foley & Lardner LLP

(57) ABSTRACT

A working apparatus has: a working equipment for doing works on a structure; an operation mechanism adapted to actively move the working equipment relative to the structure; and an adhering/traveling module coupled to the operation mechanism and adapted to adhere to the structure so as to have the weight of the working apparatus borne by the structure and travel/move on the structure for positioning. With this arrangement, the working apparatus can perform accurate positioning operations in a narrow environment and complex scanning operations by means of various pieces of the working equipment such as inspection sensors, and can secure a large working area within a short period of time and reduce the overall working hours.

10 Claims, 5 Drawing Sheets

APPARATUS AND METHOD FOR MOUNTING AND MOVING A WORKING APPARATUS ON A STRUCTURE FOR THE PERFORMANCE OF WORKS ON THE STRUCTURE

CROSS REFERENCES TO RELATED APPLICATIONS

The present application claims priority based on Japanese Patent Application No. 2005-102859, filed on Mar. 31, 2005, the entire content of which is incorporated herein by reference.

BACKGROUND OF THE INVENTION

This invention relates to a mobile working apparatus for doing works such as inspections and machining operations on structures such as nuclear reactor structures and a working method of operating such an apparatus.

Intra-nuclear-reactor working apparatuses are generally used for intra-reactor operations such as inspections, examinations and preventive maintenances of the inner surface of nuclear reactor pressure vessels and intra-reactor structures. Particularly, when the weld line found on the bottom of an annular part sandwiched between the pressure vessel inner wall and the shroud of a boiling water nuclear reactor is the target of operation, the operation faces various problems such as a limited working space and a long working time because it is difficult to access the target that is located in a very narrow area. Various intra-nuclear-reactor working apparatuses have been proposed to carry out such an operation in a short period of time and secure a larger working space.

Firstly, an intra-nuclear-reactor working apparatus comprising a slim self-propelled apparatus main body that is adapted to move on a shroud support plate, adhering to the wall surface of a nuclear reactor pressure vessel, a shroud support cylinder or a jet pump by suction, in order to inspect the weld line found on the bottom of an annular part is known (See Japanese Patent Application Laid-Open Publication No. Hei 11-174192, the entire content of which being incorporated herein by reference).

The apparatus has an inspection mechanism section that includes an airtight chamber for maintaining the orientation by buoyancy, a wall surface pushing means using a thruster and flowing water, a traveling means such as a crawler and inspection means such as various sensors. Thus, the apparatus runs by means of the crawler arranged at the bottom of the apparatus as it adheres to the wall surface so as to be guided by and move along the wall surface. Additionally, the apparatus gauges the distance from the inspection apparatus to a lateral surface of a jet pump diffuser by means of a non-contact range finder and identifies its relative position. At the same time, it identifies its absolute position on the shroud support plate from the distance covered by the crawler.

Secondly, intra-nuclear-reactor working apparatuses adapted to move on a shroud support plate between a shroud support cylinder and a jet pump adaptor by means of a pair of crawlers in order to inspect a weld line and clean a target area are also known (See Japanese Patent Application Laid-Open Publication Nos. Hei 11-109082, Hei 10-221484 and Hei 9-15376, the entire contents of which being incorporated herein by reference).

The apparatus described in Japanese Patent Application Laid-Open Publication No. Hei 11-109082 comprises a traveling mechanism section that is dimensioned to allow the apparatus to move in a narrow area and an independent inspection unit including an inspection camera and an ultrasonic search device, in which the inspection unit is coupled to and pulled by the traveling mechanism section. The apparatus described in Japanese Patent Application Laid-Open Publication Nos. Hei 10-221484 and Hei 9-15376 comprises a similar traveling mechanism section that is dimensioned to allow the apparatus to move in a narrow area and adapted to move on a shroud support plate by means of the nozzle mounted thereon for sucking and cleaning operations. These apparatuses can clean a region right below the jet pump riser pipe pinched by a jet pump adaptor.

Thirdly, an intra-nuclear-reactor working apparatus comprising a guide section formed so as to match the radius of curvature of the outer surface of a jet pump diffuser and a positioning mechanism for rigidly securing the apparatus by extruding an extrusion member toward a nuclear reactor pressure vessel to apply reaction force to the guide section for the purpose of ultrasonic inspection of detecting flaws of the welded sections of the lower ends of a jet pump adaptor at the bottom of an annular part is also known (See Japanese Patent Application Laid-Open Publication No. Hei 11-326291, the entire contents of which being incorporated herein by reference).

Unlike the above-described mobile inspection apparatus, this inspection apparatus is rigidly secured to a jet pump diffuser and is adapted to drive the inspection head for the purpose of ultrasonic inspection of detecting flaws by means of the head drive mechanism mounted in it. This apparatus is adapted to be rigidly and reliably secured to improve the accuracy of the inspection head scanning operation and hence the accuracy of inspection.

When, for example, inspecting the weld line of an intra-reactor structure such as a shroud in the water in a nuclear reactor by means of any of the known intra-nuclear-reactor working apparatuses by ultrasonic means, a phased array ultrasonic probe or the like is mounted on a vehicle that is designed to move, adhering to the wall surface by sucking, for the purpose of conveying and positioning the probe and examining the target of inspection. Additionally, a scanning mechanism having a certain degree of freedom of adjustment is employed and mounted on the vehicle for the purpose of remotely adjusting the operating position and the attitude of the probe in the inspection.

With such a combination of a vehicle and a scanning mechanism, it is possible to examine weld lines having a large radius of curvature such as those of both the inside and the outside of a shroud without giving rise to any interference of the scanning mechanism with the intra-reactor structures including the shroud and the jet pump, because the inspection sensor requires adjustment only to a slight extent. Furthermore, the risk of interference with the intra-reactor structures is low, if the scanning mechanism is fitted to the bottom side or the top side of the adhering and moving vehicle to increase the overall dimensions. Additionally, the combination of the adhering and traveling vehicle and the scanning mechanism can also be used for operations other than inspections such as cleaning operations, grinding operations and polishing operations as well as operations for improving stresses by means of laser peening involving a small reaction force. Laser peening refers to a preventive security treatment of irradiating a laser beam to or near a weld line in water in order to transform the tensile residual stress of the surface of a structure into compressive residual stress.

However, the use of a combination of a vehicle and a scanning mechanism for operations including those of examining the weld lines of shroud support cylinders and shroud support plates and the weld lines of nuclear reactor pressure vessels and shroud support plates that are found in narrow areas such as the bottom of an annular part entails the following problems.

When examining such weld lines, for example, the inspection sensor has to be made to follow the fillet-welded section showing a radius of curvature of about 15 mm so that the probe is required to change its position and attitude to a large extent. However, the space where a scanning mechanism can operate is dimensionally limited, and hence it is necessary to check the configuration, the structure and the dimensions of the scanning mechanism so that the inspection sensor may not interfere with the jet pump adaptor, if the position and the attitude of the inspection sensor are changed to a large extent.

Additionally, a sensing line is arranged between the shroud and the jet pump at the side of the shroud of the bottom of the annular part. Therefore, the overall length of the adhering and moving vehicle and that of the scanning mechanism mounted on it have to be reduced so that they may not interfere with the jet pump sensing line and the bracket anchoring it when they are moved peripherally along the shroud.

With the method of identifying the absolute position on the shroud support as described in Japanese Patent Application Laid-Open Publication No. Hei 11-174192 that is referred to above as prior art, it is conceivable that a traveling error occurs when the crawler slips in a region that is not covered by the jet pump diffuser. Additionally, in the area where the gap between the jet pump diffuser and the shroud support cylinder and the wall of the nuclear reactor pressure vessel is smallest, the gauging distance of the non-contact range finder relative to the moving distance along the wall surface is small, and thus a gauging error can occur depending on the adhering condition of the inspection apparatus to the wall surface. Therefore, it is reasonable to have apprehension of a degraded accuracy of gauging the traveling distance.

While all the intra-nuclear-reactor working apparatuses described in Japanese Patent Application Laid-Open Publication Nos. Hei 11-109082, 10-221484 and 9-15376 can move in narrow areas, they require means for highly accurately identifying the absolute position of a spot on the shroud support plate. With the intra-nuclear-reactor working apparatus described in Japanese Patent Application Laid-Open Publication No. Hei 11-326291, it is necessary that the apparatus for conveying and positioning the working equipment needs to be self-propelled in order to cover a large working area in a short period of time for the intra-nuclear-reactor working apparatus.

In view of the above-identified problems of the prior art, it is therefore an object of the present invention to provide a working apparatus and a working method that are adapted to perform accurate positioning operations in a narrow environment, such as, in the water in the nuclear reactor and complex scanning operations for various pieces of working equipment such as inspection sensors and can secure a large working area within a short period of time and reduce the overall working hours.

BRIEF SUMMARY OF THE INVENTION

In order to attain the object, according to an aspect of the present invention, a working apparatus for doing works on a structure is provided. The apparatus comprises: a working equipment to be placed vis-a-vis the structure to do a work; an operation mechanism to be mounted by the working equipment and adapted to actively move the working equipment relative to the structure; and an adhering/traveling module coupled to the operation mechanism and adapted to adhere to the structure so as to have weight of the working apparatus borne by the structure and travel/move on the structure for positioning.

According to another aspect of the present invention, a working method for doing works on a structure is provided. The method comprises: bringing in a working apparatus having an operation mechanism mounted by a working equipment and an adhering/traveling module; having the working apparatus adhere to the wall surface of the structure and the weight of the working apparatus borne by the structure; having the working apparatus travel and move along the wall surface; having the adhering/traveling module gauge the traveled quantity relative to the wall surface; and having the working apparatus perform a scanning operation on the structure by means of the operation mechanism.

DETAILED DESCRIPTION OF THE INVENTION

Now, first and second embodiments of an intra-nuclear-reactor working apparatus and a working method according to the present invention will be described referring to the accompanying drawings.

FIRST EMBODIMENT

The first embodiment of the present invention will be described by referring to FIGS. 1 through 4D. This embodiment will be described in terms of ultrasonic inspection of detecting flaws as an example of operation.

Figure 1:
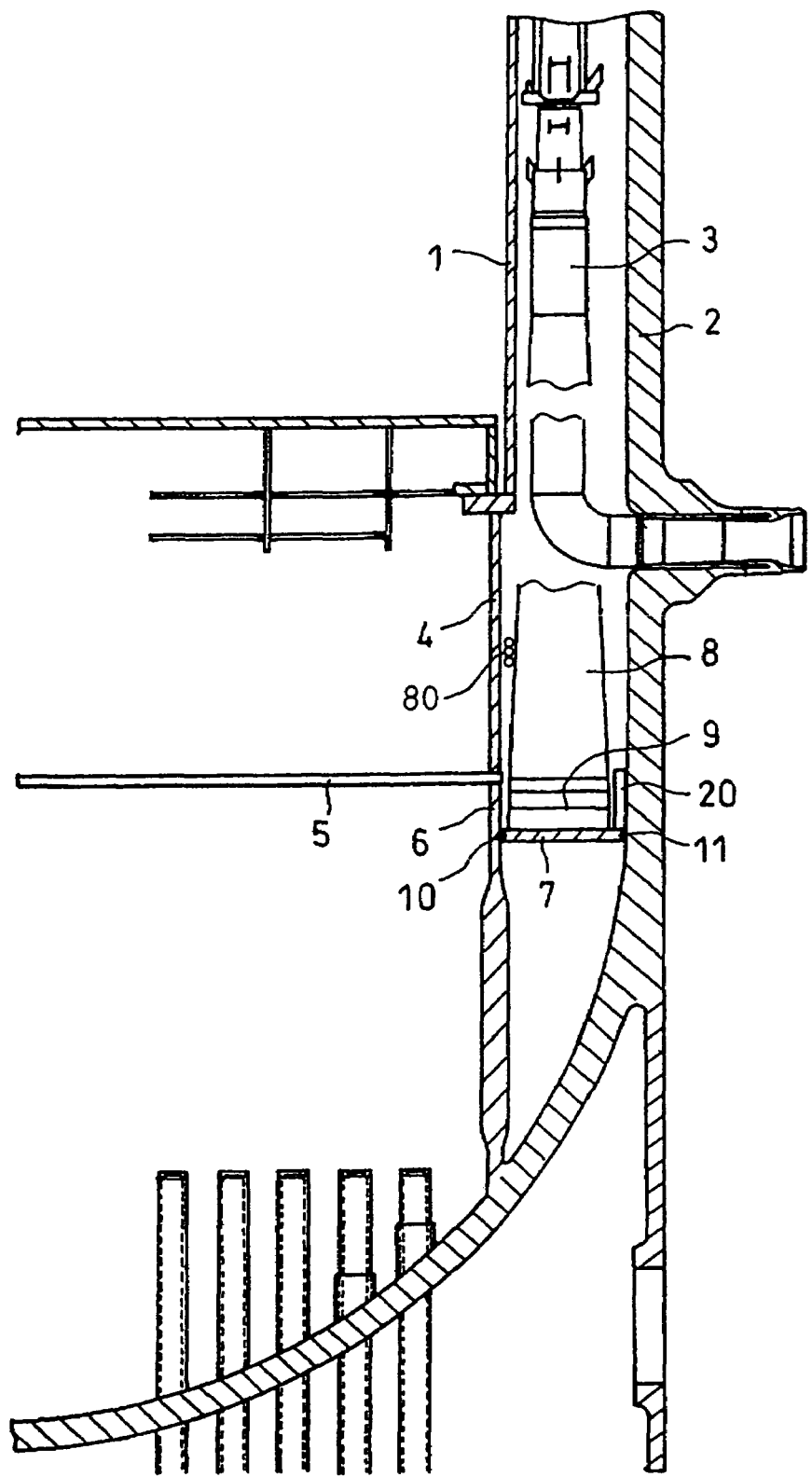
FIG. 1 is a vertical cross sectional view of a first embodiment of intra-nuclear-reactor working apparatus according to the present invention, showing how it is arranged in a nuclear reactor pressure vessel.

FIG. 1 is a conceptual schematic illustration showing how an intra-nuclear-reactor working apparatus 20 that is adapted to ultrasonic inspection of detecting flaws is arranged on the bottom of the annular part between a shroud intermediate trunk 1 and a shroud lower trunk 4, which are intra-reactor structures of a boiling water nuclear reactor, and the wall of the nuclear reactor pressure vessel 2. The object of flaw detection may be an H8 horizontal weld line 10 that is the weld line of a shroud support cylinder 6 and a shroud support plate 7 or an H9 horizontal weld line 11 that is the weld line of the nuclear reactor pressure vessel 2 and the shroud support plate 7.

Referring to FIG. 1, the intra-nuclear-reactor working apparatus 20 is arranged on the shroud support plate 7 along the inner wall of the nuclear reactor pressure vessel 2 for the purpose of inspecting the H9 horizontal weld line 11. A cable (not shown) is connected to the intra-nuclear-reactor working apparatus 20 so as to connect the latter to a control/operation section (not shown) which may typically be arranged on the operation floor or on the fuel exchanger.

Figure 2A:
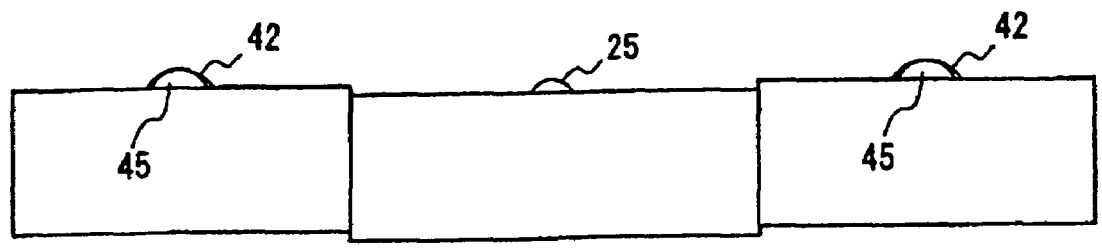
FIG. 2A is a plan view of the first embodiment of intra-nuclear-reactor working apparatus.
Figure 2B:
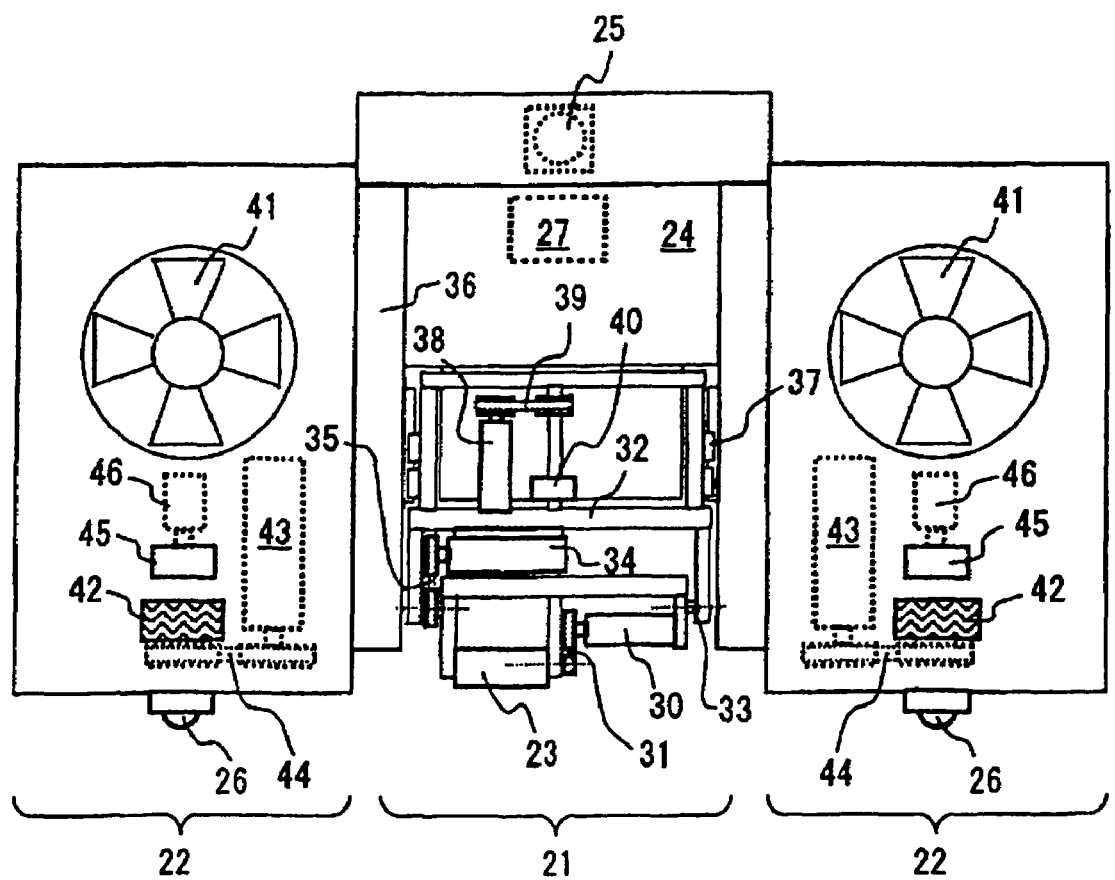
FIG. 2B is a front view of the first embodiment of intra-nuclear-reactor working apparatus.

FIGS. 2A and 2B illustrate the arrangement in the intra-nuclear-reactor working apparatus 20. As shown in the drawings, the intra-nuclear-reactor working apparatus 20 generally includes: a scanning mechanism 21 for actively driving the working equipment including a flaw detecting probe to move relative to the intra-reactor structures, and adhering/traveling modules 22 arranged at the opposite lateral sides of the scanning mechanism 21.

A phased array ultrasonic probe 23 is arranged under the center of the scanning mechanism 21 so as to operate as an ultrasonic flaw detecting sensor. The phased array ultrasonic probe 23 is driven to rotate around a horizontal axis by a timing belt 31 and a rotary shaft drive motor 30, which is a drive source. The rotary mechanism (the rotary shaft drive motor 30 and the timing belt 31) is linked to a rocking shaft base 32 that operates as the center 33 of the rocking motion by way of a rotary shaft core, which is typically a pin, so as to swing the rotary mechanism 30 around the center 33 of the rocking motion by means of the timing belt 35, using a rocking shaft drive motor 34 as a drive source. The rocking shaft base 32 is vertically movably linked to a vertical shaft base 36 by way of a linear guide 37 so that it is driven to move up and down by means of a timing belt 39, a ball screw and a nut 40, using a vertical shaft drive motor 38 as a drive source.

Each of the adhering/traveling modules 22 comprises a thruster 41 that is driven to rotate by a drive motor (not shown), a traveling wheel 42 to be used for moving horizontally along the wall surface after adhering to the wall surface, a motor 43 and a timing belt 44 for driving the traveling wheel 42, a distance gauging roller 45 and a rotary sensor 46 for gauging the horizontal traveling distance and a ball caster 26 for supporting the weight of the intra-nuclear-reactor working apparatus when it moves on the shroud support plate 7.

A float 24 is arranged at an upper part of the scanning mechanism 21 so as to position the center of buoyancy above the center of gravity in water and hence the intra-nuclear-reactor working apparatus can hold its attitude without toppling down in water. A ball caster 25 is arranged on the float 24 in order to hold the apparatus away from the wall surface by a certain distance when the latter adheres to the wall surface. Thus the ball caster 25 and the two traveling wheels 42 receive the reaction force of the wall surface when the adhering/traveling modules 22 adhere to the wall surface. The distance gauging rollers 45 are also held in contact with the wall surface. Thus, the rollers are brought into contact with the wall surface by the right force exerted to them typically by springs (not shown) and rotate when the apparatus runs horizontally.

The scanning mechanism 21 is provided with an inclination sensor 27, which detects the inclination thereof in lateral directions relative to the wall surface that the working apparatus is adhering to as viewed from the rear side of the working apparatus and monitors if the rotary shaft of the phased array ultrasonic probe 23 is horizontal or not.

Figure 3:
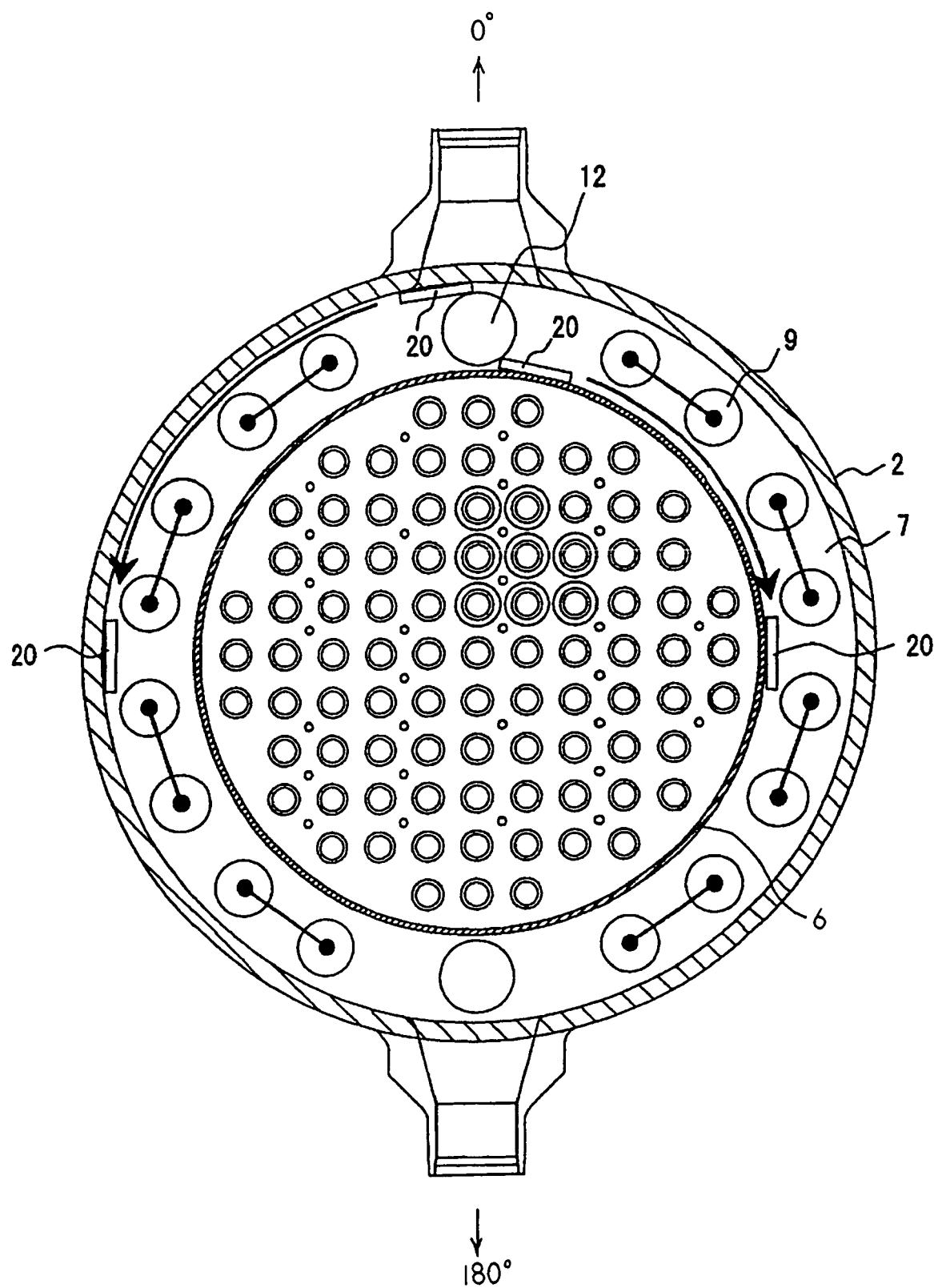
FIG. 3 is a plan view of the traveling route of the first embodiment of intra-nuclear-reactor working apparatus on a shroud support plate.

Now, the sequence of operation of arranging this embodiment of intra-nuclear-reactor working apparatus 20 on the shroud support plate 7, which is an intra-reactor structure, and carrying out an inspection will be described below by referring to FIG. 3. The intra-nuclear-reactor working apparatus 20 is suspended by the cable of a lift apparatus (not shown) and lowered from above the nuclear reactor so as to be put near one of the access hole covers 12 arranged respectively at azimuths 0° and 180° positions of the nuclear reactor. In the instance of FIG. 3, the intra-nuclear-reactor working apparatus 20 is put near the azimuth 0° of the nuclear reactor.

As the intra-nuclear-reactor working apparatus 20 is lowered to the level of the shroud upper trunk, passing by the feed water sparger, and made to enter the annular part, it is driven to approach the side of the shroud intermediate trunk 1 or the side of the wall of the nuclear reactor pressure vessel 2 depending on the position of the target of inspection by the propelling force generated by the revolutions of the two thrusters 41. If the H8 horizontal weld line 10 is the target of inspection, the intra-nuclear-reactor working apparatus 20 that is being suspended is lowered toward the shroud intermediate trunk 1 and the shroud lower trunk 4 until it is laid on the shroud support plate 7 without touching the shroud support ring 5. Then, the two thrusters 41 are driven to make the apparatus adhere to the shroud support cylinder 6.

Once the apparatus is placed on the shroud support plate 7, the apparatus is driven to move to the original position for starting the inspection. The intra-nuclear-reactor working apparatus 20 placed on the shroud support plate 7 is driven to move horizontally as the two traveling wheels 42 that are held in contact with the shroud support cylinder 6 are driven to rotate by the horizontal drive force acquired relative to the shroud support cylinder 6. The position where the access hole cover 12 and the intra-nuclear-reactor working apparatus 20 are brought to contact with each other is selected as original position. Then, the intra-nuclear-reactor working apparatus 20 is driven to move along the shroud support cylinder 6 as shown in FIG. 3, passing through the gap between the shroud support cylinder 6 and the jet pump adaptors 9, traveling at least within a range of about 90°, in order to inspect the H8 horizontal weld line 10.

At a selected position of inspection, the apparatus performs a scanning operation by means of the scanning mechanism 21 for the inspection, while it is being remotely controlled for the position and the attitude of the phased array ultrasonic probe 23 relative to the H8 horizontal weld line 10, which is the inspection target. When the scanning operation is finished for a scanning range, the apparatus moves peripherally to the next scanning range. The peripheral distance that is covered by the scanning operation is constantly and continuously gauged by the distance gauging roller 45. If the intra-nuclear-reactor working apparatus 20 is inclined laterally as viewed from behind, or as detected by the inclination sensor 27, it means that the phased array ultrasonic probe 23 is not arranged in parallel with the shroud support plate 7. If the angle of inclination exceeds a tolerance range, it is regulated so as to be found within the tolerance range by adjusting the extent by which the ball casters 26 project.

If, on the other hand, the H9 horizontal weld line 11 at the side of the wall of the nuclear reactor pressure vessel 2 is the target of inspection, the intra-nuclear-reactor working apparatus 20 is arranged at the side of the wall of the nuclear reactor pressure vessel 2 in a similar manner, and the position where the access hole cover 12 and the intra-nuclear-reactor working apparatus 20 are brought to contact with each other is selected as original position. Then, the intra-nuclear-reactor working apparatus 20 is driven to move along the wall of the nuclear reactor pressure vessel 2 as shown in FIG. 3, passing through the gap between the wall of the nuclear reactor pressure vessel 2 and the jet pump adaptors 9, traveling at least within a range of about 90°, in order to inspect the H8 horizontal weld line 10. The H8 horizontal weld line 10 and the H9 horizontal weld line 11 are inspected by placing the intra-nuclear-reactor working apparatus 20 at a total of eight positions to repeat the above sequence of operation.

Figure 4A:
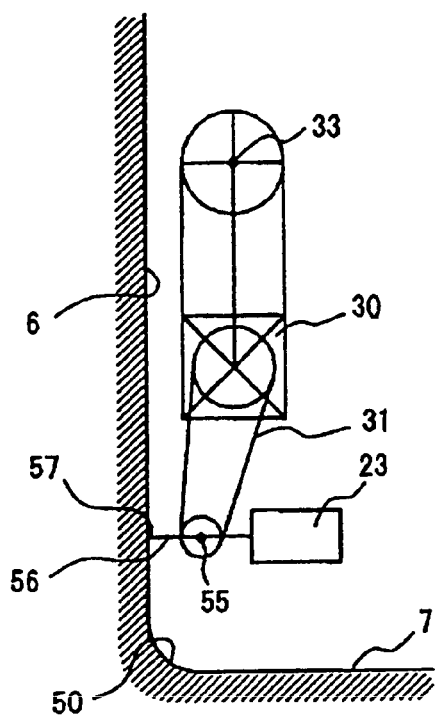
FIGS. 4A through 4D are conceptual schematic illustrations of a scanning operation of the first embodiment of intra-nuclear-reactor working apparatus.

Now, the operation of each of the drive mechanisms of the scanning mechanism 21 for inspecting the H8 horizontal weld line 10 by means of the phased array ultrasonic probe 23 will be described below by referring to FIGS. 4A through 4D. Referring firstly to FIG. 4A, the phased array ultrasonic probe 23 is irradiating an ultrasonic wave onto an ultrasonic wave irradiating position 57 on the shroud support cylinder 6 along an ultrasonic wave irradiation axis 56 that is schematically illustrated in FIG. 4A. At this time, the distance from the center 55 of rotation of the probe to the shroud support cylinder 6 is gauged by a distance sensor such as an ultrasonic sensor fitted to a lateral side of the phased array ultrasonic probe 23. The gauging direction is same as the flaw detecting direction of the phased array ultrasonic probe 23. In other words, the distance is gauged while the phased array ultrasonic probe 23 is held horizontally as shown in FIG. 4A. If necessary, on the basis of the outcome of the distance gauging operation, the rocking mechanism comprising the rocking shaft drive motor 34 and the timing belt 35 is driven to regulate the distance from the center 55 of rotation of the probe to the shroud support cylinder 6. The flaw detecting direction (the orientation of the ultrasonic wave irradiation axis 56 or the direction of ultrasonic wave irradiation) of the probe is corrected by the rotary mechanism comprising the rotary shaft drive motor 30 and the timing belt 31, while the vertical position is corrected by the vertical drive mechanism comprising the vertical shaft drive motor 38, the timing belt 39, the ball screw and the nut 40.

The distance from the center 55 of rotation of the probe to the shroud support plate 7 is gauged by rotating the phased array ultrasonic probe 23 from the state of FIG. 4A so as to direct the gauging direction of the distance sensor downward. If necessary, on the basis of the outcome of the distance gauging operation, the vertical drive mechanism is driven to regulate the distance from the center 55 of rotation of the probe to the shroud support plate 7. Thereafter, the distance from the center 55 of rotation of the probe to the shroud support cylinder 6 is gauged once again for the purpose of assurance. If the distance error exceeds a tolerance range, the above-described procedure of adjustment and correction is repeated. In this way, the distance from the center 55 of rotation of the probe to the shroud support cylinder 6 and the distance from the center 55 of rotation of the probe to the shroud support plate 7 are regulated.

Figure 4B:
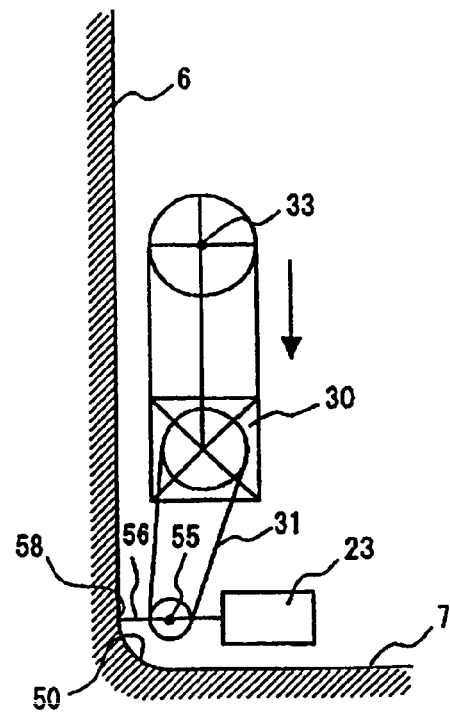
Figure 4C:
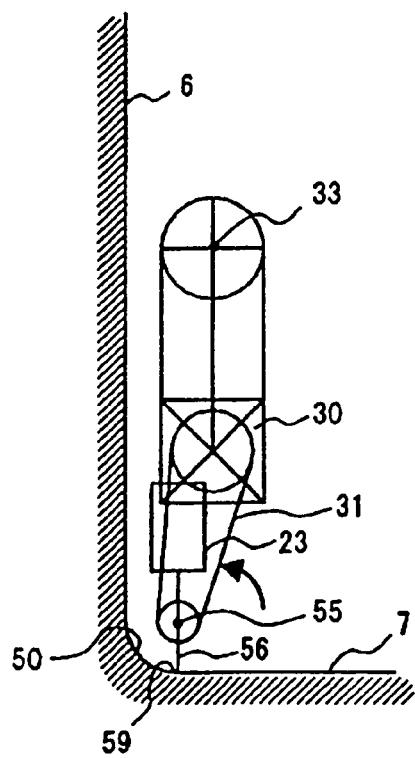
Figure 4D:
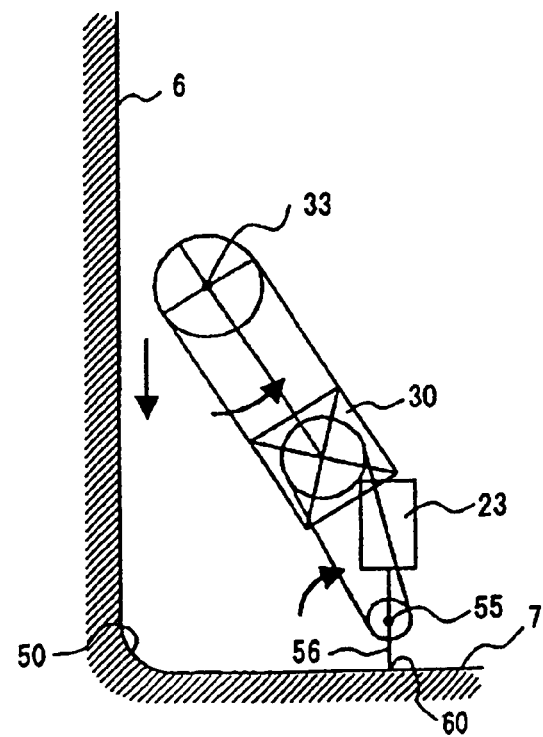

Then, referring to FIG. 4B, an ultrasonic flaw detecting operation is conducted on the shroud support cylinder 6 by lowering the phased array ultrasonic probe 23 by means of the vertical drive mechanism and scanning the shroud support cylinder 6 down to the ultrasonic wave irradiating position 58. Thereafter, as shown in FIG. 4C, an ultrasonic flaw detecting operation is conducted on the welded part by rotating the phased array ultrasonic probe 23 around the center 55 of rotation of the probe along the curvature of a fillet-welded bead 50 until the ultrasonic wave irradiation axis 56 is directed to the bottom surface, while keeping a predetermined distance to the fillet-welded bead 50.

If the surface of the fillet-welded bead 50 does not show the profile of a ¼ circle, it is possible to scan the fillet-welded bead 50, while keeping a predetermined distance to the latter, by providing the intra-nuclear-reactor working apparatus 20 with a mechanism for projecting a slit laser beam and observing the surface profile, acquiring profile data and controlling the vertical drive mechanism, the rocking mechanism and the rotary mechanism so as to follow the profile of the bead. Then, an ultrasonic flaw detecting operation is conducted on the shroud support plate 7 by operating the vertical drive mechanism, the rocking mechanism and the rotary mechanism so as to constantly direct the ultrasonic wave irradiation axis 56 perpendicularly relative to the shroud support plate 7 and scanning the shroud support plate 7 down to an ultrasonic wave irradiating position 60.

Thus, with this embodiment of intra-nuclear-reactor working apparatus 20, it is possible to scan a fillet-welded section, while remotely regulating the relative position and the attitude of the inspection sensor in the operation of inspecting a horizontal weld line of an intra-nuclear-reactor structure. As a pair of adhering/traveling modules 22 are arranged at the opposite sides of the scanning mechanism 21, it is possible to reliably hold the phased array ultrasonic probe 23 along a horizontal weld line and hence highly reliably inspect the horizontal weld line. Furthermore, since the height of the inspection apparatus is reduced, it is possible to move it on the shroud support plate 7 without allowing it to interfere with jet pump sensing lines 80. Additionally, since the apparatus travels while adhering to the shroud support cylinder 6, it is possible to apply it to a nuclear reactor where the shroud lower trunk 4 is inclined without modifying the configuration thereof. Still additionally, since separable adhering/traveling modules 22 are provided, it is possible to apply the apparatus to the undulations of the wall surface that may vary between the shroud side and the nuclear reactor pressure vessel 2 side and also to the curvature of the nuclear reactor that may vary from reactor to reactor by changing the angle of coupling between the scanning mechanism 21 and the adhering/traveling modules 22.

The scanning mechanism 21 has a simple configuration and it is possible for the scanning mechanism 21 to perform a scanning operation along a fillet-welded section without interfering with the jet pump adaptors 9 in a narrow area. Additionally, it is possible to reduce the time necessary for preparation and adjustment so as to consequently reduce the overall working hours because the position and the attitude of the scanning mechanism 21 can be adjusted depending on the output of the phased array ultrasonic probe 23.

The adhering/traveling modules 22 adhere to the wall of the shroud support cylinder 6 or that of the nuclear reactor pressure vessel 2 by means of the thrusters 41 to move horizontally by the traveling wheels 42 and directly gauge the traveled distance relative to the wall surface by means of distance gauging rollers 45 so that they can be continuously and accurately position themselves along a horizontal weld line. Therefore, it is possible to easily identify the position to be inspected and reliably perform an inspection. Since the adhering/traveling modules 22 have respective distance gauging rollers 45 to make the number of distance gauging rollers 45 equal to two, the traveled distance can be gauged accurately if one of them slips. Additionally, if the wall surface to which they are adhering has undulations such as vertical weld lines and one of the distance gauging rollers 45 rides on a protrusion, it is possible to accurately gauge the traveled distance by the other distance gauging roller 45.

A washing water discharging nozzle, a polishing brush, a grinding jig or a laser peening head may be mounted in this embodiment of the present invention in place of the phased array ultrasonic probe 23. Then, it is possible to perform a cleaning operation, a polishing operation, a grinding operation or a stress improving operation by means of an appropriate one of the working jigs or heads.

With this embodiment, it is possible to perform an inspection, a cleaning operation, a polishing operation, a grinding operation or a laser peening operation to a weld line that is found on the bottom of a very narrow annular part in a process of working on a structure in the nuclear reactor pressure vessel immersed in water. More specifically, it is possible to make the phased array ultrasonic probe 23 or some other inspection sensor or the working equipment follow a fillet-welded section of a radius of curvature of about 15 mm in a very narrow environment. Thus, it is possible to continuously position itself in a peripheral direction on a shroud support plate 7 and highly accurately gauge the traveled distance relative to a horizontal weld line to consequently improve the quantity of inspection. Additionally, it can secure a large working area within a short period of time and reduce the overall working hours.

SECOND EMBODIMENT

Figure 5A:
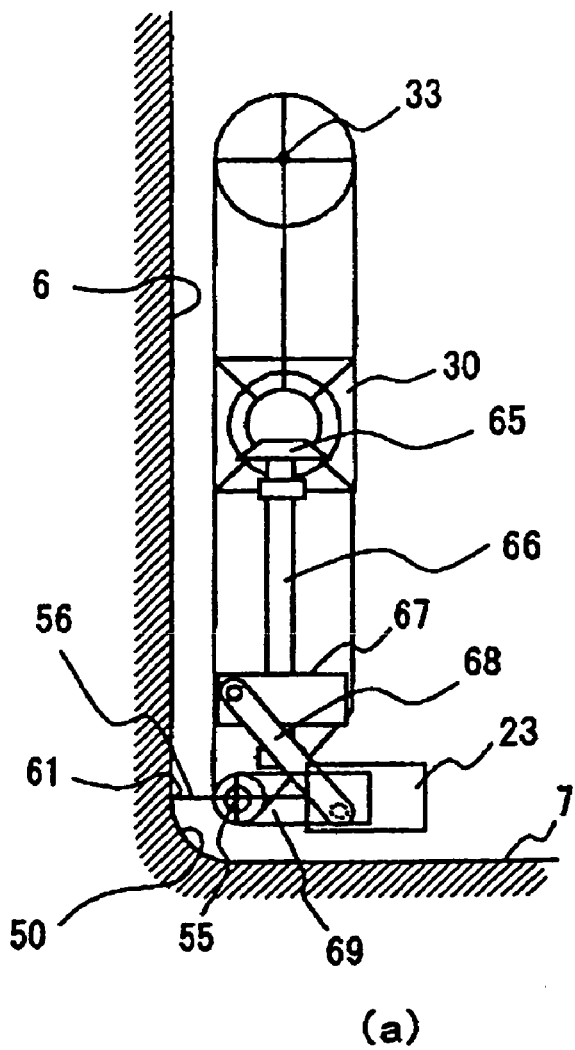
FIGS. 5A and 5B are conceptual schematic illustrations of a scanning operation of a second embodiment of intra-nuclear-reactor working apparatus according to the present invention.
Figure 5B:
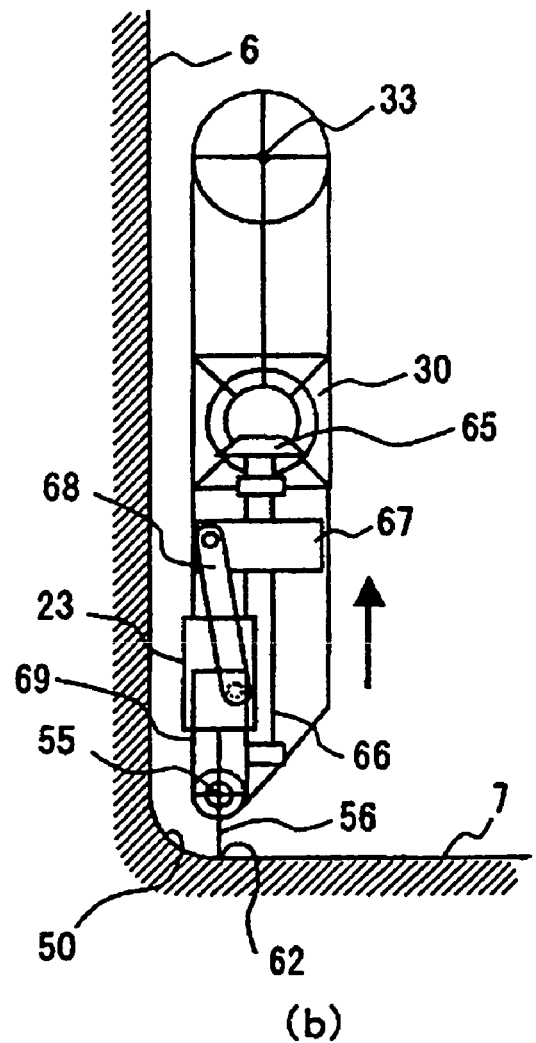

Now, the second embodiment of intra-nuclear-reactor working apparatus according to the present invention will be described below. In this embodiment, the rotary mechanism of the scanning mechanism 21 is a slider crank mechanism that is formed by means of a translation mechanism such as a ball screw and a pair of links. FIGS. 5A and 5B illustrate a scanning operation of this embodiment that comprises a slider crank mechanism. Referring to FIGS. 5A and 5B, the phased array ultrasonic probe 23 is fitted to a probe holder 69 that is rotatable around a center 55 of rotation of the probe and coupled to a nut 67 by means of a link 68. The nut 67 is driven to move up and down by means of a bevel gear 65, a ball screw 66 and a rotary shaft drive motor 30, which is a drive source.

Referring to FIG. 5A, the phased array ultrasonic probe 23 is irradiating an ultrasonic wave onto an ultrasonic wave irradiating position 61 on the shroud support cylinder 6 along an ultrasonic wave irradiation axis 56 that is schematically illustrated in FIG. 5A. As the nut 67 is raised from this state, as shown in FIG. 5B, the probe holder 69 is lifted by the link 68 to rotate the phased array ultrasonic probe 23 around the center 55 of rotation of the probe and the embodiment performs an ultrasonic flaw detecting operation along the curvature of the fillet-welded bead 50, while keeping a predetermined distance to the fillet-welded bead 50.

Since the slider crank mechanism of this embodiment is formed by means of a translation mechanism including a ball screw 66 and a nut 67, and a pair of links 68, this embodiment provides an advantage of reducing the rotary angle of the phased array ultrasonic probe 23 relative to the same rotary angle of the rotary drive motor 30, if compared with the first embodiment where the phased array ultrasonic probe 23 is driven to rotate by a timing belt 31 shown in FIGS. 2A and 2B. Therefore, it is possible to reduce the rotary backlash of the phased array ultrasonic probe 23 and to improve the accuracy of rotation.

THIRD EMBODIMENT

Now, the third embodiment of intra-nuclear-reactor working apparatus according to the present invention will be described below. In this embodiment, the mechanism constituting members and the strength holding members of the intra-nuclear-reactor working apparatus 20, the scanning mechanism 21 and the working equipment are formed by using a polymeric resin material.

Specific examples of materials that can be used for this embodiment include polyamide type resins, polyimide type resins, polyether-ether-ketone resins and polyether-sulfone-resins that are excellent in terms of resistance against radioactive rays, water-absorbing property, mechanical strength and thermal resistance. All or part of these materials may be used for the above mechanism composing members and the strength holding members.

Thus, with this embodiment, it is possible to replace polymeric resin materials in place of metal materials in order to reduce the weight of the various pieces of equipment including the intra-nuclear-reactor working apparatus 20 and the scanning mechanism 21 in water. As a result, the float 24 arranged in an upper part of the scanning mechanism 21 can be dimensionally reduced to consequently reduce the overall dimensions of the apparatus. As the apparatus is made lightweight and downsized, it can be handled easily and it can pass through narrow areas so that the reliability of operation of the apparatus is also improved.

The present invention is not limited to the above-described embodiments, which may be modified in various different ways without departing from the scope of the present invention.

For example, while the above described embodiments of the intra-nuclear-reactor working apparatus and working method are adapted to be used in nuclear reactors, the present invention can broadly be applied to various working apparatus and various working methods.

Additionally, while the above-described embodiments of working apparatus and working method are adapted to operations in water, they can be modified in various different ways as pointed out below. For example, while the operation mechanisms including the adhering/traveling modules 22 and related mechanisms may be housed in a water-tight case or the like and adapted to perform adhering/traveling operations in water, the working equipment of a working apparatus according to the present invention may be separated from them and put in air so as to operate in air. As another example, the adhering/traveling modules 22 and the thrusters 41 may be dimensionally raised to use a large drive source and a large drive mechanism for the thrusters 41 so that the thrusters 41 may acquire a sufficiently large air flow rate to produce a large adhering force in air as they are driven to rotate at high speed. With such an arrangement, a working apparatus and a working method according to the present invention may be applied to works in air.

What is claimed is:

1. A working apparatus for performing works on a structure, the apparatus comprising:
   a working equipment to be placed relative to the structure to perform a work;
   an operation mechanism adapted to actively move the working equipment relative to the structure; and
   an adhering/traveling module coupled to the operation mechanism and adapted to adhere to the structure so as to have a weight of the working apparatus borne by the structure and travel/move on the structure for positioning, wherein a part comprising a target of the work of the structure extends along a substantially horizontal line, and wherein the operation mechanism comprises:

a rotary mechanism supporting the working equipment and adapted to rotate the working equipment around a horizontal axis running in parallel with the horizontal line;

a rocking mechanism supporting the rotary mechanism and adapted to swing the rotary mechanism around the horizontal axis running in parallel with the horizontal line; and a vertical movement mechanism supporting the rocking mechanism and adapted to move the rocking mechanism up and down.

2. The working apparatus according to claim 1, wherein the structure is a structure located in a nuclear reactor pressure vessel and the working apparatus is adapted to operate in water with which the nuclear reactor pressure vessel is filled.

3. The working apparatus according to claim 1, wherein the operation mechanism is a single operation mechanism and the adhering/traveling module comprises two adhering/traveling modules coupled to opposite of sides the operation mechanism.

4. The working apparatus according to claim 1, wherein the working equipment comprises at least one selected from a group consisting of a visual inspection camera, a volume inspection ultrasonic sensor, an eddy current flaw detecting sensor, washing water discharging nozzle, a polishing brush, a grinding jig and a laser peening head.

5. The working apparatus according to claim 1, wherein the rotary mechanism comprises a rotary motor, a timing belt and a pulley.

6. The working apparatus according to claim 1, wherein the rotary mechanism comprises a rotary motor and a translation mechanism and the translation mechanism and the link comprises a slider crank mechanism.

7. The working apparatus according to claim 1, wherein the adhering/traveling module comprises:

a thruster for causing the adhering/traveling module to adhere to a wall surface of the structure in water;

a running wheel for causing the adhering/traveling module to travel a horizontal distance;

a gauging mechanism for gauging the traveled horizontal distance;

a ball caster fitted to a bottom surface of the adhering/traveling module, wherein the working apparatus has its weight borne by the ball caster;

wherein the working apparatus is adapted to move horizontally along the wall surface.

8. The working apparatus according to claim 1, wherein mechanism constituting members and strength holding members are formed using a polymeric resin material.

9. A working method for performing works on a structure, the method comprising:

bringing in a working apparatus having an operation mechanism, a working equipment, and an adhering/traveling module;

having the working apparatus adhere to a wall surface of the structure and a weight of the working apparatus is borne by the structure;

having the working apparatus travel and move a distance along the wall surface;

having the adhering/traveling module gauge the traveled distance relative to the wall surface; and having the working apparatus perform a scanning operation on the structure, wherein a part comprising a target of the work of the structure extends along a substantially horizontal line, and wherein the operation mechanism comprises:

a rotary mechanism supporting the working equipment and adapted to rotate the working equipment around a horizontal axis running in parallel with the horizontal line;

a rocking mechanism supporting the rotary mechanism and adapted to swing the rotary mechanism around the horizontal axis running in parallel with the horizontal line; and a vertical movement mechanism supporting the rocking mechanism and adapted to move the rocking mechanism up and down.

10. The working method according to claim 9, wherein the structure is located in a nuclear reactor pressure vessel and the working apparatus is adapted to operate in water with which the nuclear reactor pressure vessel is filled.

* * * * *